United States Patent

Bosshard et al.

[15] 3,676,450
[45] July 11, 1972

[54] -4-(ISOTHI OCYANOPHENYL)-THIAZOLES

[72] Inventors: Rene Bosshard, Birsfelden; Kurt Gubler, Riehen; Ernest Aufderhaar, Kaiseraugst; Paul Brenneisen, Basel, all of Switzerland

[73] Assignee: Ciba-Geigy Corporation, Ardsley, N.Y.

[22] Filed: Oct. 19, 1970

[21] Appl. No.: 82,188

[30] Foreign Application Priority Data

Oct. 30, 1969 Switzerland..................16249/69

[52] U.S. Cl.............260/302 s, 260/302 R, 260/306.8 R, 424/270
[51] Int. Cl. .....................................C07d 91/32
[58] Field of Search...............260/302, 302 S, 306.8 R

[56] References Cited

UNITED STATES PATENTS 2,603,648  7/1952  Gregory.....................260/302 S
3,127,408  3/1964  Hopkins.....................260/302 R

*Primary Examiner*—Alex Mazel
*Assistant Examiner*—R. J. Gallagher
*Attorney*—Karl F. Jorda and Frederick H. Rabin

[57] ABSTRACT

This invention concerns new 4-(isothiocyanophenyl)-thiazoles corresponding to the Formula I

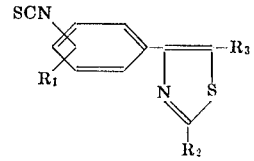

wherein (I)

$R_1$ represents hydrogen, the nitro group, halogen, a lower alkyl or alkoxy radical, or the isothiocyano group in a position other than the ortho-position to the isothiocyano group already present, $R_2$ represents hydrogen, halogen, a lower alkyl, alkoxy or alkylthio radical, a dialkylamino radical, and $R_3$ represents hydrogen or a lower alkyl radical, and processes for the production of these compounds. These new compounds have antihelmintic properties. Compositions containing these new 4-(isothiocyanophenyl)-thiazoles and/or their non-toxic salts as active components as well as a method for combatting helminths in warm-blooded animals organisms by administering these new compounds in therapeutically active doses are given. Of special interests are the 4-(isothiocyanophenyl)-thiazoles of Formula I wherein $R_1$ is hydrogen or halogen.

9 Claims, No Drawings

4-(ISOTHIOCYANOPHENYL)-THIAZOLES

DETAILED DISCLOSURE

The present invention concerns new 4-(isothiocyanophenyl)-thiazoles and processes for the production of these new compounds, as well as anthelmintic compositions containing these new compounds as active components and a method for combatting helmints in warm-blooded animal organisms by administering these new 4-(isothiocyanophenyl)-thiazoles in therapeutically effective amounts.

Among endoparasites occurring in warm-blooded animals, especially the helminths cause great damage to these animals. Thus, for example, animals infested by worms not only show retarded growth, but often injuries occur which can result in the death of the animals. It is therefore of great importance to develop agents which are suitable for the control of helminths in all stages of their development and for preventing infestation by these parasites. Although there are a number of substances known having anthelminthic properties, they are often not satisfactory, be it that their action is insufficient when applied in toxicologically tolerable doses, or that when applied in therapeutically effective doses, undesirable side effects appear, or that they show only a very specific range of action. Thus, for example, d,l-2,3,5,6-tetrahydro-6-phenylimidazo[2,1-5]thiazole, known from Dutch Pat. No. 6,505,806, is only effective against nematodes, but not against trematodes and cestodes.

In the present description, the term "helminths" refers to nematodes, cestodes and trematodes, i.e. to helminths of the gastrointestinal tract, the liver and other organs.

The new 4-(isothiocyanophenyl)-thiazoles correspond to the Formula I

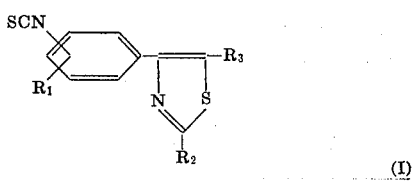

In this formula
- $R_1$ represents hydrogen, the nitro group, halogen, a lower alkyl or alkoxy radical, or the isothiocyano group in a position other than the orthoposition to the isothiocyano group already present,
- $R_2$ represents hydrogen, halogen, a lower alkyl, alkoxy or alkylthio radical, a dialkylamino radical, and
- $R_3$ represents hydrogen or a lower alkyl radical.

As lower alkyl groups, $R_1$, $R_2$ and $R_3$ represent, in the above formula, straight or branched chain radicals having one to four carbon atoms, for example the following: methyl, ethyl, n-propyl, isopropyl, n-butyl, iso-butyl, tert-butyl, sec-butyl radicals. $R_1$ and $R_2$ as alkoxy, alkylthio and dialkylamino radicals have at most four carbon atoms in a straight chain or three to four carbon atoms in a branched chain. By halogen is meant fluorine, chlorine, bromine or iodine, preferably however chlorine and bromine.

The 4-(isothiocyanophenyl)-thiazoles of Formula I are produced according to the invention by reacting a 4-(aminophenyl)-thiazole of Formula II

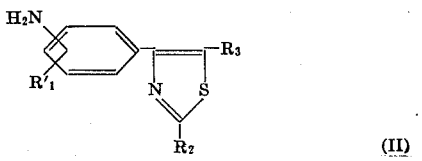

wherein
- $R'_1$ represents hydrogen, the nitro group, halogen, a lower alkyl or alkoxy radical, or the amino group in a position other than the ortho-position to the amino group already present, while
- $R_2$ and $R_3$ have the meanings given for Formula I, either a. with a thiocarbonic acid derivative of the formula

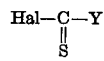

wherein Hal represents chlorine or bromine,
Y represents chlorine, bromine or a dialkylamino group; or b. with a sulphide of the formula

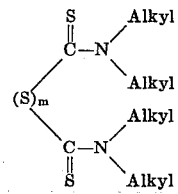

wherein Alkyl represents a lower alkyl radical having at most four carbon atoms and m represents the number 1 or 2; or c. with pentathio-dipercarbonic acid bis-(trihalogenalkyl) esters; or d. with phosgene and phosphorus pentasulphide in a solvent or diluent which is inert towards the reaction components; or e. by converting a compound of Formula II with benzoyl isothiocyanate into the corresponding thiourea and thermally decomposing this in the presence of a solvent which is inert towards the reaction components, preferably in an aromatic hydrocarbon or halohydrocarbon or in the presence of acids or acid anhydrides; or f. by converting a compound of Formula II with carbon disulphide in the presence of an inorganic base or an amine into the corresponding dithiocarbamic acid salts and then splitting off the mercapto moiety; or g. with carbon disulfide and a carbodiimide in the presence of a tertiary amine; or h. with ammonium rhodanide in the presence of gaseous hydrogen chloride.

These processes are preferably performed in the presence of solvents or diluents which are inert towards the reaction components.

In the process according to the invention, there are employed as thiocarbonic acid derivatives mentioned under (a) either thiophosgene, optionally in the presence of an acid-binding agent and at temperatures between 0° and 75° C., or N,N-diethylthiocarbamoyl chloride at temperatures between 40° and 200° C.

The thiocarbonyl group is introduced by known methods: reactions of amines with thiophosgene (a) are described in Houben-Weyl, 4th edition, volume 9, page 876 (1955), the use of acid-binding agents by O.E. Schultz in Arch. Pharm. 295, 146–151 (1962), the reaction of amines with N,N-diethylthiocarbamoyl chloride (a) in the Journal org. Chem. 30, 2465 (1965), with bis-thiocarbamoyl sulphides (b) by F.H. Marquardt in Helv. chim. Acta 49, 1716 (1966), and reactions with pentathio-dipercarbonic acid bis-(trihalogenalkyl) ester (c) by R.Gottfried in Angew.Chemie 78, 985 (1966), and reactions with phosgene and phosphorus pentasulphide in Houben-Weyl, 4th edition, volume 9, page 867 ff.

For the reactions mentioned under (d) and (e), o-dichlorobenzene and chlorobenzene are preferably used as solvent, other suitable solvents, however, are dichlorobenzenes toluene, xylenes, cumene, etc. The thermal decomposition of thioureas (e) is performed as described by J.N. Baxter et al. in J.Chem. Soc. (1956), page 659 ff. The thioureas are produced according to Org. Syntheses III, 735, (1955). As inorganic bases for the production of dithiocarbamic acid salts (f), for example, the hydroxides, oxides and carbonates of alkali metals and alkaline earth metals as well as ammonium hydroxide are used; as tertiary amines, for example, trialkyl amines, pyridine bases or ammonia [see C.A. 70, 3389 q (1969)] used. The stripping off of the mercapto moiety can be performed oxidatively with metal salts (British Pat. No. 793,802; Dutch Pat. No. 81,326), e.g. with lead, copper, zinc or iron-(III) salts, iodine, alkali-metal hypochlorites and chlorites, preferably those of potassium and sodium (French Pat. No. 1,311,855), furthermore, with suitable acid halides such as phosgene and phosphoroxy chloride [D.Martin et al., Chem. Ber. 98, 2,425–2,426 (1965)], as well as with elementary chlorine and ammonium sulphide (German specification open to public inspection Pat. No. 1,192,189), or Chloramine T (British Pat. No. 1,024,913).

As inert solvents or diluents, the following may be used, for example, in the process according to the invention: aliphatic and aromatic hydrocarbons, aliphatic and aromatic halogenated hydrocarbons, ether and ether-type compounds, ketones, amides such as dimethyl formamide etc., water or mixtures of such solvents with water.

The new 4-(isothiocyanophenyl)-thiazoles of Formula I in which $R_2$ represents a dialkyl amino group, can be converted into the corresponding salts with acids which are non-toxic for the human and animal organisms. Suitable acids are inorganic and organic acids such as, for example, hydrohalic acids, sulphuric acid, phosphoric acids, acetic acid, aminoacetic acid, butyric acid, lauric acid, stearic acid, oxalic acid, adipic acid, tartaric acid, lactic acid, methane-sulphuric acid, p-toluene-sulphonic acid, etc. Furthermore, such thiazoles can be converted with the usual quaternizing agents, such as alkyl halide, dialkyl sulphates, toluene sulphonic acid esters, into the corresponding quaternary ammonium salts. If the anion of the quaternary salt is toxic for animal organisms, it can be exchanged for a non-toxic anion by reacting it with a non-toxic acid.

The amines serving as starting materials can be employed in the form of the free base and also as acid addition salts, particularly of mineral acids.

Of the aminophenyl thiazoles falling under Formula II serving as starting materials, some of them are known in the literature or they can be produced by know processes, for example by catalytic reduction of the corresponding nitro compounds. Aminophenyl thiazoles of Formula II in which $R_2$ represents a lower alkoxy, alkylthio or dialkylamino radical can be obtained either from 2-halo-4-(aminophenyl)-thiazoles by reacting with corresponding alkali alkanolates, alkali mercaptides or dialkylamines, or by reacting nitrophenacyl thiocyanate with corresponding alkanols, mercaptans or dialkylamines in the presence of strong acids, such as p-toluene-sulphonic acid, and subsequently catalytically hydrogenating the nitro group.

The active substances according to the invention have pronounced anthelminthic properties. The new active substances are especially suited for controlling parasitic nematodes: e.g.

Ascaridae, Trichostrongylidae, Strongylidae, Ancylostomatidae;

cestodes: e.g. Taeniidae, Anoplocephalidae;

trematodes: e.g. Fasciolidae in domestic and farm animals such as cattle, sheep, goats, horses, pigs, cats, dogs and poultry. They can be administered to the animals in single or repeated doses. Depending on the type of animal, the individual doses range preferably between 25 and 1,000 mg per kg/body weight. By using protracted administration, in some cases it is possible to obtain a better effect, or it is possible to attain the same results with a smaller total dosage. The active substances or mixtures containing them can be added to the feed or to the drinking trough. The final feed contains the substances of Formula I preferably in a concentration of about 0.05 to 1 percent by weight.

Particularly important due to their excellent anthelmintic effect are the 4-(isothiocyanophenyl)-thioazoles of the Formula III

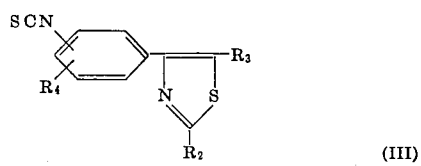

(III)

wherein $R_4$ represents hydrogen or halogen, and $R_2$ and $R_3$ have the meanings given for Formula I.

The new active substances can be administered to the animals perorally or via the abomasum in the form of solutions, emulsions, suspensions (drenches), powders, tablets, boluses and capsules. To prepare the forms of application listed above, conventional solid carriers can be used such as kaolin, talcum, bentonite, sodium chloride, calcium phosphate, hydrocarbons, cellulose powder, cottonseed meal, carbowaxes, gelatins, or liquids such as water, if desired with the addition of surface-active substances such as ionic or non-ionic dispersing agents, and also oils and other solvents and diluting agents which are non-injurious for animal organisms. When the anthelmintic agents are in the form of feed concentrates, carriers which can be used are, for example, production feeds, fodder grains, or protein concentrates. Such feed concentrates can also contain, in addition to the active substances, other additives, vitamins, antibiotic, chemotherapeutic, bacteriostatic, fungistatic and coccidiostatic substances, hormone preparations, substances having an anabolic action or other substances which promote growth, influence the quality of the meat of animals to be slaughtered, or are useful to the animal organism in other ways.

Several tests to determine the anthelmintic activity of the new active substances of the general Formula I are described in the following.

Determination of the anthelmintic effect on chickens infested with *Ascaridia galli*

1- to 3-day-old chicks were artificially infested with eggs of *Ascaridia galli*. Groups of 5 chicks each were used for each test. Four to 5 weeks after infestation, the active substances were administered to the animals in a single dose per day on 3 consecutive days. Infested chickens that had not been treated served as controls.

EVALUATION

The number of *Ascaridia galli* eliminated by each test group during 5 days after the first administration of the active substance was determined daily and in addition the number of worms still found in the intestine after dissection on the 5th day. Furthermore, the number of chickens free from worms was determined.

The agents were tolerated by the chickens without any symptoms.

| Active substance: | Daily dosage in mg/kg of body weight | Number of *Ascaridia galli* eliminated per test day and test group | number of worms found at dissection per test animal | number of chickens free of worms |
|---|---|---|---|---|
| 2-n-propyl-4-(3'-isothiocyanophenyl)-thiazole | 750 | 0—8—36—11—1 | 0-0-0-0-0 | 5 |
| 2-methyl-4-(3'-isothiocyanophenyl)-thiazole | 83.3 | 0-0-0-50-118 | 0-0-0-0-0 | 5 |
| 2-methylthio-4-(3'-isothiocyanophenyl)-thiazole | 750 | 0-63-66-4 | 0-0-0-0 | 5 |
| 2-ethoxy-4-(4'-methoxy-3'-isothiocyanophenyl)-thiazole | 500 | 0-21-107-14-0 | 0-0-0-0-3 | 4 |
| 2-bromo-4-(3'-isothiocyanophenyl)-thiazole | 500 | 0-1-53-1-0 | 0-0-0-0-0 | 5 |
| 2-chloro-4-(4'-chloro-3' isothiocyanophenyl)-thiazole | 500 | 0-0-88-4-0 | 0-0-0-0-0 | 5 |
| 2-isopropoxy-4-(3'-isothiocyanophenyl)-thiazole | 500 | 0-5-105-10-10 | 0-0-0-0-0 | 5 |

Tests on mice infested with *Hymenolepis nana*

The active substances, in the form of a suspension, were administered via an esophagal sound to white mice which had been infested with Hymenolepis nana. Five animals were used for each test. The active substances were administered once a day to each animal on 3 consecutive days. The animals were then killed and dissected on the 8th day after the beginning of the treatment.

The results were evaluated after dissection of the test animals by counting the number of tape worms in the intestines. Untreated mice which had been infested in the same way and at the same time served as controls.

The agents were tolerated by the mice without any symptoms.

*Hymenolepis nana*

| Active substance: | Daily dosage in mg/kg of body weight | Infestation of the five test animals at dissection | Infestation of the control animals at dissection |
|---|---|---|---|
| 2-methyl-4-(3'-isothiocyanophenyl)-thiazole | 250 | 0-0-0-0-0 | 3-9-15-15-20 |
| 2-methyl-4-(3'-isothiocyano-4'-bromo-phenyl)-thiazole | 750 | 0-0-0-0-2 | 4-12-16-21-23 |
| 4-(3'-isothiocyanophenyl)-thiazole | 300 | 0-0-0-0-0 | 0-1-2-4-5 |
| 2-isopropoxy-4-(4'-isothiocyanophenyl)-thiazole | 500 | 0-0-0-0-0 | 3-4-7-9-11 |
| 2-chloro-5-methyl-4-(3'-isothiocyanophenyl)-thiazole | 750 | 0-0-0-0-0 | 0-1-2-4-5 |
| 2-chloro-4-(4'-isothiocyanophenyl)-thiazole | 500 | 0-0-0-0-0 | 2-4-4-5-7 |
| 2-ethoxy-4-(3'-isothiocyanophenyl)-thiazole | 500 | 0-0-0-0-0 | 3-4-7-9-11 |
| 2-ethoxy-4-(2'-isothiocyanophenyl)-thiazole | 500 | 0-0-0-0-0 | 6-9-10-11-12 |
| 2-methylthio-4-(3'-isothiocyanophenyl)-thiazole | 500 | 0-0-0-0-0 | 8-11-13-16 |
| 2-methyl-4-(4'-chloro-3'-isothiocyanophenyl)-thiazole | 250 | 0-0-0-0-3 | 3-6-12-15-17 |

Tests on rats infested with *Fasciola hepatica*

White laboratory rats are infested with liver flukes (Fasciola hepatica). On completion of the prepatency period, the infestation of the rats by liver flukes is determined by three separate analyses of the faeces.

For each test, 2 to 4 infested rats are treated once daily for three consecutive days with the active substance which is applied via an esophagal sound in the form of a suspension. From the third to the fifth week after administration of the active substance, the faeces are analyzed once a week to determine whether they contain any eggs of liver flukes. At the end of the fifth week of the test, the test animals are killed and examined for the presence of liver flukes.

*Fasciola hepatica*

| Active substance | Daily dosage in mg/kg of body weight | Faeces control for elimination of eggs 3 times before medication | after medication | number of liver flukes dissection | General condition |
|---|---|---|---|---|---|
| 2-methyl-4-(4'-isothiocyanophenylphenyl)-thiazole | 100 | positive | negative | 0-0-0-0 | good |
| 2-methyl-4-(3'-isothiocyanophenyl)-thiazole | 100 | " | " | 0-0-0-0 | good |
| 2-n-propyl-4-(3'-isothiocyanophenyl)-thiazole | 200 | " | " | 0-0-0-0 | good |
| 2-chloro-5-methyl-4-(3'-isothiocyanophenyl)-thiazole | 200 | " | " | 0-0 | good |
| 2-chloro-4-(3'-isothiocyanophenyl)-thiazole | 75 | " | " | 0-0 | good |
| 4-(3'-isothiocyanophenyl)-thiazole | 50 | " | " | 0-0-0-0 | good |
| 2-methylthio-4-(3'-isothiocyanophenyl)-thiazole | 200 | " | " | 0-0-0-2 | good |

Tests on mice infested with mouse Oxyuridae

The active substance was administered via an esophagal sound in the form of a suspension to white mice which had been infested with mouse Oxyuridae. The active substances were administered to each animal once daily for three consecutive days. The animals were then killed on the 8th day after the beginning of treatment, and dissected.

The results were evaluated after dissection of the test animals by counting the number of mouse Oxyuridae in the intestines. Untreated mice which had been infested in the same manner served as controls.

The agents were tolerated by the mice without any symptoms.

*Mouse Oxyuridae*

| Active substance: | Daily dosage in mg/kg of body weight | Length of administration in days | Infestation of the test animals at dissection | Infestation of the control animals at dissection |
|---|---|---|---|---|
| 2-methyl-4-(3'-isothiocyanophenyl)-thiazole | 250 | 3 | 0-0-0-3-4 | 8-7-10-20-25 |
| 2-methyl-4-(3'-isothiocyano-4'-bromo-phenyl)-thiazole | 750 | 3 | 0-0-0-0-0/1 | 12-12-12-21-33 |
| 2-ethyl-4-(4'-isothiocyanophenyl)-thiazole | 250 | 3 | 0-0-0-0-0 | 1-2-5-3-9 |
| 4-(3'-isothiocyanophenyl)-thiazole | 300 | 2 | 1-0-0-2-0 | 1-2-3-3-4 |
| 2-isopropoxy-4-(4'-isothiocyanophenyl)-thiazole | 500 | 3 | 0-0-0-0-0 | 8-12-19-21-24 |
| 2-chloro-5-methyl-4-(3'isothiocyanophenyl)-thiazole | 750 | 3 | 0-0-0-0-0 | 1-2-3-3-4 |
| 2-ethoxy-4-(3'-isothiocyanophenyl)-thiazole | 500 | 3 | 0-0-0-0-0 | 8-12-19-21-24 |
| 2-chloro-4-(4'-isothiocyanophenyl)-thiazole | 300 | 3 | 0-0-0-0-0 | 6-7-10-20-25 |
| 2-methylthio-4-(3'-isothiocyanophenyl)-thiazole | 750 | 3 | 0-0-0-0-0 | 12-12-10-9-8 |

The following examples serve to illustrate the process according to the invention. The temperatures are given in degrees centigrade.

EXAMPLE 1 a. 15 g. of thioacetamide are added to 48.8 g. of 4-nitrophenacyl bromide which have been suspended in 240 ml of ethanol. The pasty suspension is stirred for 15 hours at room temperature, cooled to 5° and suction filtered. The crude product is washed with cold ethanol and recrystallized from 320 ml of ethanol.

40 g (91 percent) of 2-methyl-4-(4'-nitrophenyl)-thiazole, m.p. 143°–143.5°, are obtained.

b. 36 g of 2-methyl-4-(4'-nitrophenyl)-thiazole are dissolved in 400 ml of dioxane, 7 g of Raney nickel are added and the mixture is hydrogenated at 25° under normal pressure. As soon at the calculated amount of hydrogen has been taken up, the Raney nickel is removed by filtration and the filtrate is concentrated by evaporation in vacuum. The residual crude product can be used in the following reaction without further purification.

c. 31 g of 2-methyl-4-(4'-aminophenyl)-thiazole are dissolved in 330 ml of methylene chloride and covered with a layer of 200 ml of water. While cooling with ice and stirring, 22 g of thiophosgene are added. The mixture is stirred for half an hour and then neutralized with a saturated aqueous solution of potassium carbonate. The organic phase is then removed, washed with water and dried over magnesium sulphate. The solvent is removed by distillation and the residue is recrystallized from 175 g of benzene/petroleum ether. 27 g (71 percent of theory) of 2-methyl-4-(4'-isothiocyanophenyl)-thiazole, m.p. 114°–115°, are obtained.

EXAMPLE 2

11 g of 4-(3'-aminophenyl)-2-n-propyl-thiazole are added while cooling at 0° to a solution of 20 g of phosgene in 100 ml of dry o-dichlorobenzene. The white suspension is first stirred for 12 hours at room temperature, then heated during 45 minutes to 90° while simultaneously introducing phosgene, and then without further addition of phosgene heated at 125°–130° until gas development ceases. The mixture is then slowly cooled to room temperature and 3.75 g of phosphorus pentasulphide are added. After refluxing for 14 hours, the mixture is filtered, the filtrate is concentrated in vacuum and the residue is distilled. The 4-(3'-isothiocyanophenyl)-2-n-propyl-thiazole has a boiling point of 163°–165°/0.05 Torr.

EXAMPLE 3

First 31 ml of triethylamine and then 4.3 ml of carbon disulphide are added dropwise at −10 to −5° C., to 15.9 g of 4-(3'-aminophenyl)-2-n-propyl-thiazole dissolved in 360 ml of absolute diethyl ether. The clear solution is then stirred at room temperature, then 6.7 ml of phosphorus oxychloride dissolved in 80 ml of diethyl ether are added at 0° during 30 minutes. The mixture is then stirred for 10 more hours at room temperature. The precipitate which forms is removed, the filtrate is concentrated in vacuum, and the residue is dissolved in chloroform. The chloroform extract is washed neutral with sodium bicarbonate solution and water, and, after drying, the solvent is removed. After distillation, the oily residue is identical to the compound produced according to Example 2.

EXAMPLE 4

Hydrogen chloride gas is introduced at 0°–5° for 90 minutes into a suspension of 10.9 g of 4-(3'-aminophenyl)-2-n-propyl-thiazole and 15.4 g of bis-(N,N-diethylthiocarbamoyl)-disulphide in 250 ml of absolute chlorobenzene. The mixture is then refluxed for 4½ hours. The precipitate which separates is removed, taken up with 10 percent aqueous sodium hydroxide solution and extracted with chlorobenzene. The filtrate is likewise washed with 10 percent aqueous sodium hydroxide solution, the chlorobenzene phase is separated and combined with the chlorobenzene extract. The chlorobenzene solutions are dried and concentrated. The precipitate which forms as the residual oil cools is removed, and the oil is distilled in vacuum. The compound obtained is identical to the compound produced according to Example 2.

EXAMPLE 5

21.2 g of benzoyl chloride are carefully added to a solution of 12.2 g of ammonium isothiocyanate in 75 ml of dry acetone. After the exothermic reaction has subsided, the mixture is kept at reflux temperature and a hot solution of 32.7 g of 4-(4'-aminophenyl)-2-n-propyl-thiazole in 40 ml of dry acetone is added. The mixture is heated for several minutes at reflux temperature. After cooling, the light yellow suspension is added to 1,100 ml of ice water; the precipitate which separates is removed and added to a hot, aqueous 10 percent sodium hydroxide solution. The solution is heated for a few minutes at the boil, then cooled in an ice bath and neutralized with concentrated hydrochloric acid. The white suspension is adjusted to a pH of 8 with aqueous ammonia. The solid is removed and washed neutral with water. After drying and recrystallizing from methanol, the material is refluxed for 14 hours in 55 ml of chlorobenzene. The clear solution is then concentrated in vacuum, and the residue is distilled at 159°/0.04 Torr. The 4-(4'-isothiocyanophenyl)-2-n-propyl-thiazole solidifies and has a melting point of 52°–53°.

EXAMPLE 6

11 g of 4-(4-aminophenyl)-2-n-propyl-thiazole are stirred for 14 hours at 20°–25° with 7.4 g of bis-(trichloromethanesulfenyl)-trithiocarbonate [pentathio-dipercarbonic acid-bis-trichloromethyl ester] in 50 ml of water. The greasy precipitate is separated, washed with water, and taken up in chloroform. The insoluble particles are removed; the filtrate is dried and concentrated in vacuum. After distillation, the residue solidifies and is identical to the compound produced according to Example 5.

Example 7

15.4 g of 4-(4'-aminophenyl)-2-n-propyl-thiazole are refluxed for 4 hours with 11.4 g of N,N-diethylthiocarbamoyl chloride in 200 ml of absolute toluene. The solution is filtered hot, the filtrate is concentrated, and the residue is taken up in chloroform. The chloroform solution is filtered and dried and then concentrated in vacuum. After distillation, the residue crystallizes and is identical to the compound produced according to Example 5.

EXAMPLE 8

9.9 g of 2-chloro-4-(3-aminophenyl)-thiazole hydrochloride are refluxed for 16 hours with a solution of 2.8 g of metallic sodium in 100 ml of absolute ethanol. The suspension is then added to 400 ml of ice water and extracted with ether. The ether extract is washed with water, dried and concentrated by evaporation in vacuum. The residual oil is taken up in 400 ml of absolute ethanol. The alcoholic solution is adjusted with an ethereal solution which has been saturated with hydrogen chloride to a pH of 3 to 2. The hydrochloride which precipitates is removed and recrystallized from isopropanol; m.p. 220° with decomposition.

The resultant 2-ethoxy-4-(3'-aminophenyl)-thiazole hydrochloride is then converted by one of the methods described in Examples 1 (c) to 7 into 2-ethoxy-4-(3'-iso-thiocyanophenyl)-thiazole; m.p. 53°–54°.

EXAMPLE 9

20 g of p-nitrophenacyl thiocyanate are heated to 80° in 150 ml of absolute toluene and 50 ml of absolute butanol and during 45 minutes added to the boiling solution of 1.5 g of p-toluene-sulphonic acid in 150 ml of absolute butanol. The water formed during the reaction is continually removed from the reaction mixture (water separater). The yellow solution is then refluxed for 10 hours and subsequently evaporated to dryness in vacuum. The residue is taken up in methanol and left to stand for 1 hour in an ice bath. The precipitate which separates is removed, washed with ether and recrystallized from methanol. The 2-butoxy-4-(4'-nitrophenyl)-thiazole has a melting point of 86.5°. The compound is reduced to the corresponding aminophenyl-thiazole compound as described in Example 1 (b), and then converted according to one of the methods described in Examples 1 (c) to 7 into 2-butoxy-4-(4'-isothiocyanophenyl)-thiazole.

The following 4-(isothiocyanophenyl)-thiazoles of Formula I are also produced according to the previous examples:

| Compounds: | physical data: |
|---|---|
| 2-chloro-4-(3'-isothiocyanophenyl)-thiazole | m.p. 63–64° |
| 2-chloro-4-(4'-chloro-3'-isothiocyanophenyl)-thiazole | m.p. 90–91° |
| 2-chloro-4-(4'-methoxy-3'-isothiocyanophenyl)-thiazole | m.p. 114.5–115.5° |
| 2-chloro-4-(4'-methyl-3'-isothiocyanophenyl)-thiazole | m.p. 101–102° |
| 4-(3'-isothiocyanophenyl)-thiazole | m.p. 60.5–62° |
| 2-chloro-5-methyl-4-(3'-isothiocyanophenyl)-thiazole | m.p. 97–98° |
| 2-chloro-4-(4'-isothiocyanophenyl)-thiazole | m.p. 117–118° |
| 2-ethoxy-4-(3'-isothiocyanophenyl)-thiazole | m.p. 53.5–54° |
| 2-ethoxy-4-(4'-methoxy-3'-isothiocyanophenyl)-thiazole | ca. 52° |
| 2-isopropoxy-4-(3'-isothiocyanophenyl)-thiazole | ca. 20°  $n_D^{20} = 1.6548$ |
| 2-isopropoxy-4-(4'-isothiocyanophenyl)-thiazole | ca. 53° |
| 2-bromo-4-(3'-isothiocyanophenyl)-thiazole | m.p. 78° |
| 2-methylthio-4-(3'-isothiocyanophenyl)-thiazole | m.p. 77–79° |
| 2-isopropylthio-4-(4'-isothiocyanophenyl)-thiazole | |
| 2-methyl-4-(3'-isothiocyanophenyl)-thiazole | m.p. 51–54° |
| 2-methyl-4-(4'-chloro-3'-isothiocyanophenyl)-thiazole | m.p. 120–121° |
| 2-methyl-4-(4'-bromo-3'-isothiocyanophenyl)-thiazole | m.p. 123.5–125° |
| 2-ethyl-4-(4'-isothiocyanophenyl)-thiazole | m.p. 64–65° |
| 2-isopropyl-4-(4'-isothiocyanophenyl)-thiazole | b.p. 157°/0.015 Torr |
| 2-isopropyl-4-(3'-isothiocyanophenyl)-thiazole | b.p. 152/0.04 Torr |
| 2-isopropyl-4-(4'-bromo-3'-isothiocyanophenyl)-thiazole | |
| 2-methyl-4-(2',4'-di-isothiocyanophenyl)-thiazole | m.p. 94–96° |
| 2-butylthio-4-(4'-isothiocyanophenyl)-thiazole | |
| 2-dimethylamino-4-(4'-isothiocyanophenyl)-thiazole | |
| 2-isopropylthio-4-(4'-isothiocyanophenyl)-thiazole | |
| 4-(4'-isothiocyanophenyl)-2-trimethylammonio-thiazole-iodide | |
| 2-dimethylamino-4-(4'-isothiocyano-phenyl)-thiazole-hydrochloride | |
| 2-methyl-4-(4'-butoxy-3'-isothiocyano-phenyl)-thiazole | |
| 2-methyl-5-butyl-4-(3'-isothiocyanophenyl)-thiazole | |
| 2-n-propyl-4-(2'-isothiocyanophenyl)-thiazole | |

The following examples describe the production of forms for application of anthelminthically active agents and feed additives. "Parts" mean parts by weight.

Dispersible powder

The following components are used to produce 50 percent dispersible powders:

a. 50 parts of 2-chloro-5-methyl-4-(3'-isothiocyanophenyl)-thiazole,
 1 part of a polyethylene-oxy-propylene glycol having a molecular weight of about 2000 (Pluronic L 61),
 5 parts of the ammonium salt of a sulphonated naphthalene-sulphonic acid/phenol formaldehyde condensation product (Irgatan AG1),
 44 parts of kaolin;

b. 50 parts of 2-methyl-4-(3'-isothiocyanophenyl)-thiazole,
 1 part of a polyethylene-oxy-propylene glycol having a molecular weight of about 8000 (Pluronic F 68),
 0.5 part of sodium lignin sulphonate,
 48.5 parts of sodium silicate.

The active substances given are mixed with the carriers and dispersing agents and finely ground. The powder obtained can be mixed with fluid or semi-fluid feedstuffs and given to domestic and farm animals.

Paste

The following ingredients are used to produce a 40 percent paste:

40 parts of 2-methyl-4-(3'-isothiocyanophenyl)-thiazole,
2.5 parts of sodium lignin sulphonate,
0.3 part of sodium benzoate,
10 parts of glycerin,
47.2 parts of distilled water.

The active ingredient and the dispersing agents are intimately mixed. The resultant paste is mixed with fluid or semi-fluid feedstuffs for dispensing to domestic and farm animals.

Feed-additive pellets

The following active ingredients are used to produce 35 percent feed-additive pellets:

35 parts of 2-chloro-5-methyl-4-(3'-isothiocyanophenyl)-thiazole,
15 parts of molasses,
5 parts of liquorice powder,
25 parts of dried green fodder meal,
20 parts of ground bran.

The active substance and the dispersing agents are mixed and formed to pellets in a feed press. This feed additive concentrate is mixed with the feed given to domestic and farm animals.

Emulsifiable concentrate

By mixing 2 parts of 2-chloro-5-methyl-4-(3'-isothiocyanophenyl)-thiazole,
2 parts of a polyethylene-oxy-propylene glycol having a molecular weight of about 3000 (Pluronic L 64), and
96 parts of acetone, an emusifiable concentrate is obtained which can be diluted with water to emulsions of any desired concentration, and for example may be given as a drink to domestic and farm animals.

Oily formulation

40 Parts of 2-chloro-5-methyl-4-(3'-isothiocyanophenyl)- thiazole, are ground as fine as possible in a suitable mill and then homogeneously mixed e.g., on a roller frame with 60 parts of peanut oil.

These oily pastes can be given to the animals orally.

What we claim is:

1. A 4-(isothiocyanophenyl)-thiazole of the Formula I

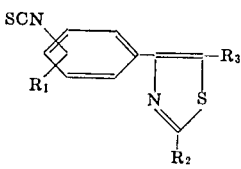

(I)

wherein $R_1$ is hydrogen, the nitro group, halogen, a lower alkyl or alkoxy radical, or the isothiocyano group in a position other than the ortho-position to the isothiocyano group already present, $R_2$ is hydrogen, halogen, a lower alkyl, alkoxy or alkylthio radical, a diloweralkylamino radical, and $R_3$ is hydrogen or a lower alkyl radical.

2. 4-(isothiocyanophenyl)-thiazole according to Formula I, claim 1, wherein $R_1$ is hydrogen or halogen, and $R_2$ and $R_3$ have the meaning given in claim 1.

3. 2-Methyl-4-(3'-isothiocyanophenyl)-thiazole.
4. 2-Methylthio-4-(3'-isothiocyanophenyl)-thiazole.
5. 2-n-Propyl-4-(3'-isothiocyanophenyl)-thiazole.
6. 4-(3'-isothiocyanophenyl)-thiazole.
7. 2-Chloro-4-(4'-isothiocyanophenyl)-thiazole.
8. 2-Chloro-5-methyl-4-(4'-isothiocyanophenyl)-thiazole.
9. 2-Ethoxy-4-(3'-isothiocyanophenyl)-thiazole.

* * * * *